US012323307B2

(12) United States Patent
Chen et al.

(10) Patent No.: US 12,323,307 B2
(45) Date of Patent: Jun. 3, 2025

(54) SERVICE PROCESSING METHOD, NETWORK MANAGEMENT AND CONTROL SYSTEM, AND STORAGE MEDIUM

(71) Applicant: Huawei Technologies Co., Ltd., Shenzhen (CN)

(72) Inventors: Lujing Chen, Nanjing (CN); Wenfang Tang, Wuhan (CN); Hui Wang, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/186,634

(22) Filed: Mar. 20, 2023

(65) Prior Publication Data

US 2023/0246920 A1   Aug. 3, 2023

Related U.S. Application Data

(63) Continuation of application No. PCT/CN2021/107052, filed on Jul. 19, 2021.

(30) Foreign Application Priority Data

Sep. 18, 2020   (CN) .......................... 202010986437.2

(51) Int. Cl.
    *H04L 41/22*   (2022.01)
    *H04L 41/12*   (2022.01)
(52) U.S. Cl.
    CPC .............. *H04L 41/22* (2013.01); *H04L 41/12* (2013.01)

(58) Field of Classification Search
    CPC ..... H04L 41/12; H04L 41/22; H04L 41/0631; H04L 41/0895; H04L 43/0817; H04L 41/0806; H04L 41/5041; H04L 41/122
    See application file for complete search history.

(56) References Cited

U.S. PATENT DOCUMENTS 7,523,187 B1    4/2009  Lavallee et al.
2001/0042118 A1* 11/2001 Miyake .................. H04L 41/22
                                              709/224

(Continued)

FOREIGN PATENT DOCUMENTS

CN          1878086 A     12/2006
CN        102035678 A      4/2011
(Continued)

*Primary Examiner* — David R Lazaro
*Assistant Examiner* — Zia Khurshid
(74) *Attorney, Agent, or Firm* — Conley Rose, P.C.

(57) ABSTRACT

A service processing method includes receiving a first identifier or a second identifier, where the first identifier indicates a first device, and the second identifier indicates a first service application; determining a first topology network based on the first identifier and an association relationship, or determining a second topology network based on the second identifier and an association relationship, where the association relationship is a relationship between at least one device and at least one service application, the first topology network reflects a topology relationship between the first device and the at least one service application, and the second topology network reflects a topology relationship between the first service application and the at least one device; and presenting the first topology network or the second topology network.

20 Claims, 13 Drawing Sheets

(56) References Cited

U.S. PATENT DOCUMENTS

| | | |
|---|---|---|
| 2010/0057780 A1 | 3/2010 | Isobe et al. |
| 2013/0108263 A1 | 5/2013 | Srinivas et al. |
| 2016/0105350 A1 | 4/2016 | Greifeneder et al. |
| 2017/0093645 A1* | 3/2017 | Zhong .................... H04L 41/12 |
| 2018/0351804 A1 | 12/2018 | Mohanram |
| 2020/0162352 A1* | 5/2020 | Jorgenson ............... H04L 43/04 |

FOREIGN PATENT DOCUMENTS

| | | |
|---|---|---|
| CN | 102308522 A | 1/2012 |
| CN | 103532746 A | 1/2014 |
| CN | 105471656 A | 4/2016 |
| CN | 107682199 A | 2/2018 |
| CN | 110278111 A | 9/2019 |
| CN | 112217691 A | 1/2021 |
| EP | 3570493 A1 | 11/2019 |
| WO | 2015160810 A1 | 10/2015 |
| WO | 2020123030 A1 | 6/2020 |

* cited by examiner

SERVICE PROCESSING METHOD, NETWORK MANAGEMENT AND CONTROL SYSTEM, AND STORAGE MEDIUM

CROSS-REFERENCE TO RELATED APPLICATIONS

This application is a continuation of International Patent Application No. PCT/CN2021/107052, filed on Jul. 19, 2021, which claims priority to Chinese Patent Application No. 202010986437.2, filed on Sep. 18, 2020. The disclosures of the aforementioned applications are hereby incorporated by reference in their entireties.

TECHNICAL FIELD

Embodiments of the present disclosure relate to the field of computer technologies, and specifically, to a service processing method, a network management and control system, and a storage medium.

BACKGROUND

Currently, physical networking of a data center is increasingly large, and physical devices and networking in the physical networking are also complex, and in addition, there are increasingly more logical networking functions and networking types corresponding to the physical networking.

However, in a related technology, the physical networking of the data center still depends on a design document left in a network construction phase, and network operation and maintenance personnel need to log in to devices in the physical networking one by one during actual operation and maintenance. In addition, an existing network management technology and an existing software-defined network (SDN) technology can present global physical networking only based on a fabric architecture, and therefore the network operation and maintenance personnel cannot clearly learn a service application carried on each device in the physical networking. In addition, it is difficult to present a correspondence between logical networking and physical networking by using a visual graph, and operation and maintenance difficulty increases. In addition, in SDN-based physical networking, a same physical device in the physical networking may be virtualized into a large quantity of virtual network elements. When an exception occurs, the network operation and maintenance personnel cannot detect a root cause of the exception in a timely manner based on a global physical networking topology. Consequently, the network operation and maintenance personnel cannot rectify a fault in a timely manner, and the operation and maintenance difficulty further increases.

Therefore, how to effectively reduce the operation and maintenance difficulty for the network operation and maintenance personnel in a process of maintaining the data center has become an urgent problem to be resolved.

SUMMARY

Embodiments of the present disclosure provide a service processing method, a network management and control system, and a storage medium, so that not only partial operation and maintenance can be implemented from a perspective of a device, and a specific service application carried on each device can be clearly learned, to avoid unavailability of service applications carried on all devices due to comprehensive network upgrade, but operation and maintenance can also be implemented from a perspective of a service application, to efficiently help network operation and maintenance personnel control a single service application in a panoramic manner, and reduce operation and maintenance difficulty.

According to a first aspect, an embodiment of the present disclosure provides a service processing method, and the method may be applied to a network management and control system. The network management and control system includes at least one device, each of the at least one device is in an association relationship with at least one service application, and the service processing method may include: receiving a first identifier or a second identifier, where the first identifier indicates a first device, the second identifier indicates a first service application, the first device is any one of the at least one device, and the first service application is any one of the at least one service application; determining a first topology network based on the first identifier and the association relationship, or determining a second topology network based on the second identifier and the association relationship, where the first topology network reflects a topology relationship between the first device and the at least one service application, and the second topology network reflects a topology relationship between the first service application and the at least one device; and presenting the first topology network or the second topology network. In the foregoing manner, the first topology network is determined based on the first identifier and the association relationship, so that the first topology network reflects the topology relationship between the first device and the at least one service application; and the first topology network is presented, so that network operation and maintenance personnel can perform operation and maintenance from a perspective of a device, and clearly learn a specific service application carried on the first device, to avoid unavailability of service applications carried on all devices due to comprehensive network upgrade. In addition, the second topology network is determined based on the second identifier and the association relationship, so that the second topology network reflects the topology relationship between the first service application and the at least one device; and the second topology network is presented, so that the network operation and maintenance personnel can perform operation and maintenance from a perspective of a service application, to efficiently help the network operation and maintenance personnel control a single service application in a panoramic manner, and reduce operation and maintenance difficulty.

In some embodiments, the method further includes: obtaining an application layer parameter, a logical layer parameter, an overlay layer parameter, and a physical layer parameter for the first service application; and respectively presenting an application layer view, a logical layer view, an overlay layer view, and a physical layer view based on the application layer parameter, the logical layer parameter, the overlay layer parameter, and the physical layer parameter, where the application layer view is used to reflect service information of at least one business service in the first service application, the logical layer view is used to reflect network resource information of the first service application, the overlay layer view is used to reflect a traffic flow status of the at least one business service, and the physical layer view is used to reflect the second topology network. In the foregoing manner, the first service application is abstracted into four layers, so that the application layer view, the logical layer view, the overlay layer view, and the physical layer view are respectively presented, to implement visual view presentation of the first service application, and further monitor the first service application.

In some embodiments, the first topology network further reflects a network resource status of the first device. In the foregoing manner, a network resource status of a device can be learned, so that a root cause can be traced based on the network resource status when an exception occurs.

In some embodiments, after the presenting a first topology network based on the first identifier and the association relationship, or presenting a second topology network based on the second identifier and the association relationship, the method further includes: obtaining the network resource status of the first device, where there is the association relationship between the first device and the first service application; and displaying a traffic exception status of the first service application when the network resource status of the first device changes, where the traffic exception status includes a traffic exception path.

In some embodiments, the displaying a traffic exception status of the first service application includes: highlighting the traffic exception path in the overlay layer view. In the foregoing manner, the traffic exception path is highlighted in the overlay layer view, so that the network operation and maintenance personnel can quickly query and locate the traffic exception path with abnormal traffic.

In some embodiments, the method further includes obtaining service update information; and updating, in the application layer view, a business service in the first service application based on the service update information. In the foregoing manner, the business service is updated in the application layer view in the first service application, to facilitate capacity expansion, offline, or the like of the service application.

In some embodiments, the method further includes monitoring a network status of the at least one device; when a device whose network status is abnormal exists in the at least one device, determining a fault status of the device whose network status is abnormal; and determining an exception handling policy based on the fault status of the device whose network status is abnormal. In the foregoing manner, the exception handling policy is determined based on the fault status, so that the network management and control system can repair, based on the exception handling policy, the device whose network status is abnormal.

In some embodiments, the receiving a first identifier or a second identifier includes: receiving a first operation instruction on the first device, to obtain the first identifier; or receiving a second operation instruction on the first service application, to obtain the second identifier.

In some embodiments, after the respectively presenting an application layer view, a logical layer view, an overlay layer view, and a physical layer view based on the application layer parameter, the logical layer parameter, the overlay layer parameter, and the physical layer parameter, the method further includes: rotating the application layer view, the logical layer view, the overlay layer view, and the physical layer view based on a preset three-dimensional model; or determining a rotation angle based on angle information of the application layer view, the logical layer view, the overlay layer view, and the physical layer view, and rotating the application layer view, the logical layer view, the overlay layer view, and the physical layer view based on the rotation angle. In the foregoing manner, each layer of the first service application is rotated, so that the network operation and maintenance personnel can comprehensively know and observe content reflected at each of the four layers in the first service application.

According to a second aspect, an embodiment of the present disclosure provides a network management and control system. The network management and control system includes at least one device, each of the at least one device is in an association relationship with at least one service application, and the network management and control system may include: a transceiver unit configured to receive a first identifier or a second identifier, where the first identifier indicates a first device, the second identifier indicates a first service application, the first device is any one of the at least one device, and the first service application is any one of the at least one service application; a determining unit configured to determine a first topology network based on the first identifier received by the transceiver unit and the association relationship, or determine a second topology network based on the second identifier received by the transceiver unit and the association relationship, where the first topology network reflects a topology relationship between the first device and the at least one service application, and the second topology network reflects a topology relationship between the first service application and the at least one device; and a presenting unit configured to present the first topology network or the second topology network.

In some embodiments, the transceiver unit is further configured to obtain an application layer parameter, a logical layer parameter, an overlay layer parameter, and a physical layer parameter for the first service application; and the presenting unit is configured to respectively present an application layer view, a logical layer view, an overlay layer view, and a physical layer view based on the application layer parameter, the logical layer parameter, the overlay layer parameter, and the physical layer parameter that are obtained by the transceiver unit. The application layer view is used to reflect service information of at least one business service in the first service application, the logical layer view is used to reflect network resource information of the first service application, the overlay layer view is used to reflect a traffic flow status of the at least one business service, and the physical layer view is used to reflect the second topology network.

In some embodiments, the first topology network further reflects a network resource status of the first device.

In some embodiments, the transceiver unit is further configured to: after the first topology network is presented based on the first identifier and the association relationship, or the second topology network is presented based on the second identifier and the association relationship, obtain a network resource status of the first device; and the presenting unit is configured to display a traffic exception status of the first service application when the network resource status of the first device changes, where the traffic exception status includes a traffic exception path.

In some embodiments, the presenting unit is configured to highlight the traffic exception path in the overlay layer view.

In some embodiments, the network management and control system further includes an updating unit; the transceiver unit is configured to obtain service update information; and the updating unit is configured to update, in the application layer view, a business service in the first service application based on the service update information obtained by the transceiver unit. In some embodiments, the network management and control system further includes a monitoring unit; the monitoring unit is configured to monitor a network status of the at least one device; the determining unit is configured to: when a device whose network status is abnormal exists in the at least one device, determine a fault status of the device whose network status is abnormal; and the determining unit is configured to determine an exception handling policy based on the fault status of the device whose network status is abnormal.

In some embodiments, the receiving unit is configured to: receive a first operation instruction on the first device, to obtain the first identifier; or receive a second operation instruction on the first service application, to obtain the second identifier.

In some embodiments, the network management and control system further includes a rotation unit; and the rotation unit is configured to: after the presenting unit respectively presents the application layer view, the logical layer view, the overlay layer view, and the physical layer view based on the application layer parameter, the logical layer parameter, the overlay layer parameter, and the physical layer parameter, rotate the application layer view, the logical layer view, the overlay layer view, and the physical layer view based on a preset three-dimensional model; or the determining unit is configured to determine a rotation angle based on angle information of the application layer view, the logical layer view, the overlay layer view, and the physical layer view; and the rotation unit is configured to rotate the application layer view, the logical layer view, the overlay layer view, and the physical layer view based on the rotation angle determined by the determining unit.

According to a third aspect, an embodiment of the present disclosure provides a computer readable storage medium including instructions. When the instructions are run on a computer, the computer is enabled to perform the method in the first aspect or any possible implementation of the first aspect.

According to a fourth aspect, an embodiment of the present disclosure provides a computer program product including instructions. When the computer program product is run on a computer, the computer is enabled to perform the method in the first aspect or any possible implementation of the first aspect.

According to a fifth aspect, an embodiment of the present disclosure provides a chip system. The chip system includes a processor configured to support a network management and control system in implementing a function in the first aspect or any possible implementation of the first aspect. In a possible design, the chip system further includes a memory. The memory is configured to store a program instruction and data that are necessary to the first device. The chip system may include a chip, or may include a chip and another discrete component.

It can be learned from the foregoing technical solutions that embodiments of the present disclosure have the following advantages:

In embodiments of the present disclosure, the network management and control system includes the at least one device, and each of the at least one device is in an association relationship with the at least one service application. In this way, the network management and control system receives the first identifier indicating the first device or the second identifier indicating the first service application, and determines the first topology network based on the first identifier and the association relationship, so that the first topology network reflects the topology relationship between the first device and at least one service application; and the first topology network is presented, so that the network operation and maintenance personnel can perform operation and maintenance from a perspective of a device, and clearly learn a specific service application carried on the first device, to avoid unavailability of service applications carried on all devices due to comprehensive network upgrade; the second topology network is determined based on the second identifier and the association relationship, so that the second topology network reflects the topology relationship between the first service application and the at least one device; and the second topology network is presented, so that the network operation and maintenance personnel can perform operation and maintenance from a perspective of a service application, to efficiently help the network operation and maintenance personnel control a single service application in a panoramic manner, and reduce operation and maintenance difficulty.

BRIEF DESCRIPTION OF DRAWINGS

To describe the technical solutions in embodiments of the present disclosure more clearly, the following briefly describes the accompanying drawings for describing embodiments. It is clear that the accompanying drawings in the following description show merely some embodiments of the present disclosure.

DESCRIPTION OF EMBODIMENTS

Figure 1:
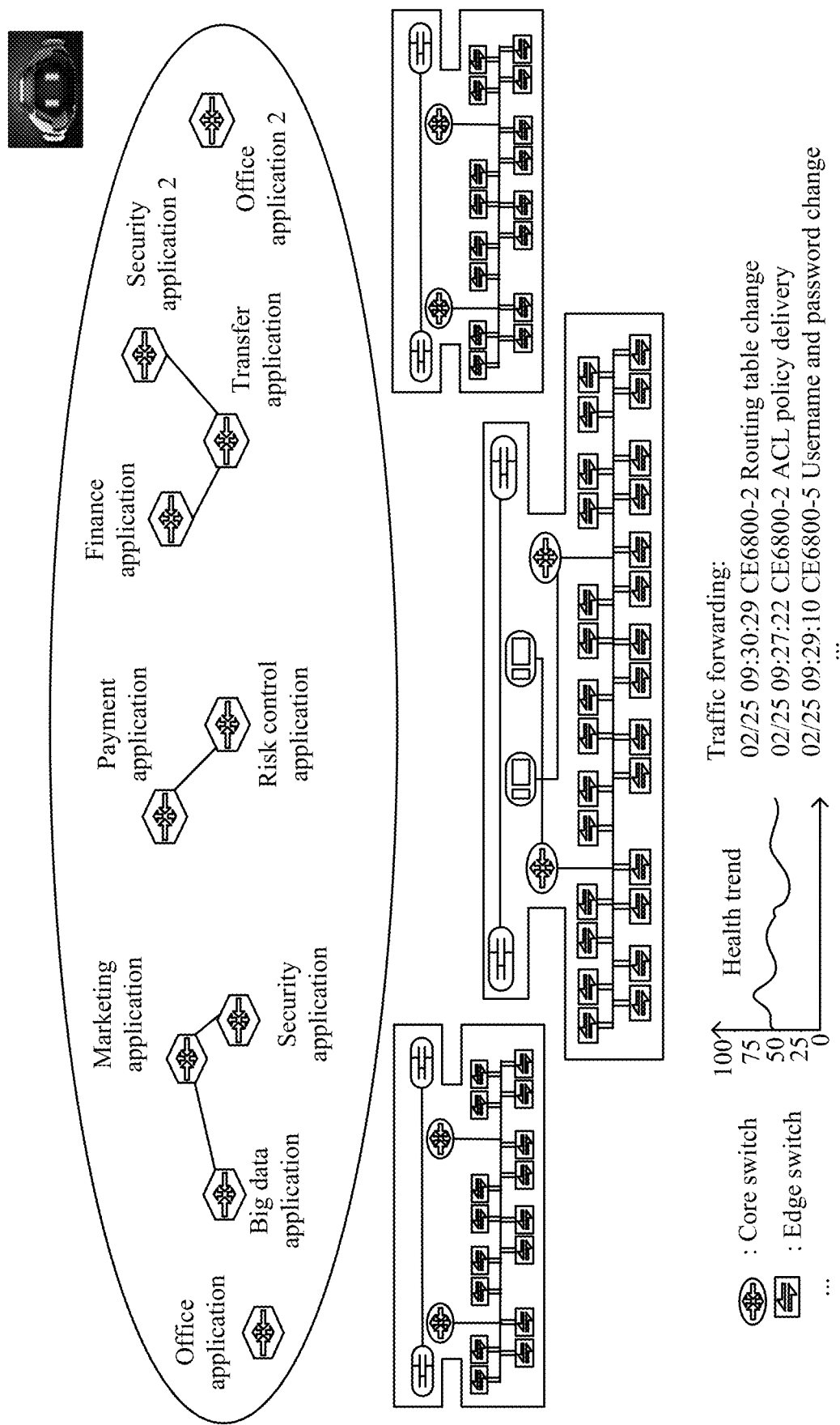
FIG. 1 is a schematic diagram of an application scenario according to an embodiment of the present disclosure.

Embodiments of the present disclosure provide a service processing method, a network management and control system, and a storage medium, so that not only partial operation and maintenance can be implemented from a perspective of a device, and a specific service application carried on each device can be clearly learned, to avoid unavailability of service applications carried on all devices due to comprehensive network upgrade, but operation and maintenance can also be implemented from a perspective of a service application, to efficiently help network operation and maintenance personnel control a single service application in a panoramic manner, and reduce operation and maintenance difficulty.

In the specification, claims, and accompanying drawings of the present disclosure, the terms "first", "second", "third", "fourth", and so on (if existent) are intended to distinguish between similar objects but do not necessarily indicate a specific order or sequence. It should be understood that data used in such a way is interchangeable in a proper circumstance, so that embodiments of the present disclosure described herein can be implemented in other orders than the order illustrated or described herein. In addition, the terms "include" and "have" and any other variants are intended to cover non-exclusive inclusion. For example, a process, method, system, product, or device that includes a list of steps or units is not necessarily limited to those expressly listed steps or units, but may include other steps or units not expressly listed or inherent to such a process, method, product, or device.

Currently, physical networking of a data center is increasingly large, and there are increasingly more networking types and device roles, and in addition, there are increasingly more logical networking functions and networking types corresponding to the physical networking. However, in a related technology, the physical networking of the data center still depends on a design document left in a network construction phase, and network operation and maintenance personnel need to log in to devices in the physical networking one by one during actual operation and maintenance. In addition, an existing network management technology and an existing SDN technology can present global physical networking only based on Fabric, and therefore the network operation and maintenance personnel cannot clearly learn a service application carried on each device in the physical networking. In addition, it is difficult to present a correspondence between logical networking and physical networking by using a visual graph, and operation and maintenance difficulty increases. In addition, in SDN-based physical networking, a same physical device in the physical networking may be virtualized into a large quantity of virtual network elements. When an exception occurs, the network operation and maintenance personnel cannot detect a root cause of the exception in a timely manner based on a global physical networking topology. Consequently, the network operation and maintenance personnel cannot rectify a fault in a timely manner, and the operation and maintenance difficulty further increases.

To resolve the foregoing problem, an embodiment of the present disclosure provides a service processing method. The service processing method may be applied to a network management and control system, for example, iMaster_NCE. In addition, the network management and control system may be applied to scenarios such as an operator network, a data center, an enterprise zone, and an enterprise private line. In an embodiment, in actual application, the network management and control system may be further applied to another operation and maintenance scenario. This is not limited herein. For example, FIG. 1 is a schematic diagram of an application scenario according to an embodiment of the present disclosure. It can be learned from FIG. 1 that the network management and control system is mainly applied to a scenario of a data center, and in addition, the network management and control system may include at least one device and at least one service application, and each of the at least one device is in an association relationship with one or more service applications in the at least one service application. For example, the at least one service application shown in FIG. 1 may include an office application, a security application, a finance application, a marketing application, a big data application, a risk control application, a transfer application, a security application 2, an office application 2, or a payment application. In an embodiment, each of the foregoing devices may carry one or more service applications, and each service application may also be carried on one or more devices. In addition, FIG. 1 further shows a key status of a data communication network (DCN) of the network management and control system, such as a health trend, a carried service application, or carried traffic. This is mainly to provide a basis for monitoring the service application subsequently. In addition, the network management and control system shown in FIG. 1 may further include an intelligent body device. The intelligent body device is used as an interactive input/output port, and can implement information interaction between the network management and control system and network operation and maintenance personnel.

It should be noted that the device described above may be a gateway device, an edge switch, a core switch, a physical device, or the like. This is not limited herein in this embodiment of the present disclosure. In addition, the service application described above may further include, but is not limited to, an office application 3, a security application 3, a finance application 2, a marketing application 2, a payment application 2, or the like. This is not limited herein.

Figure 2:
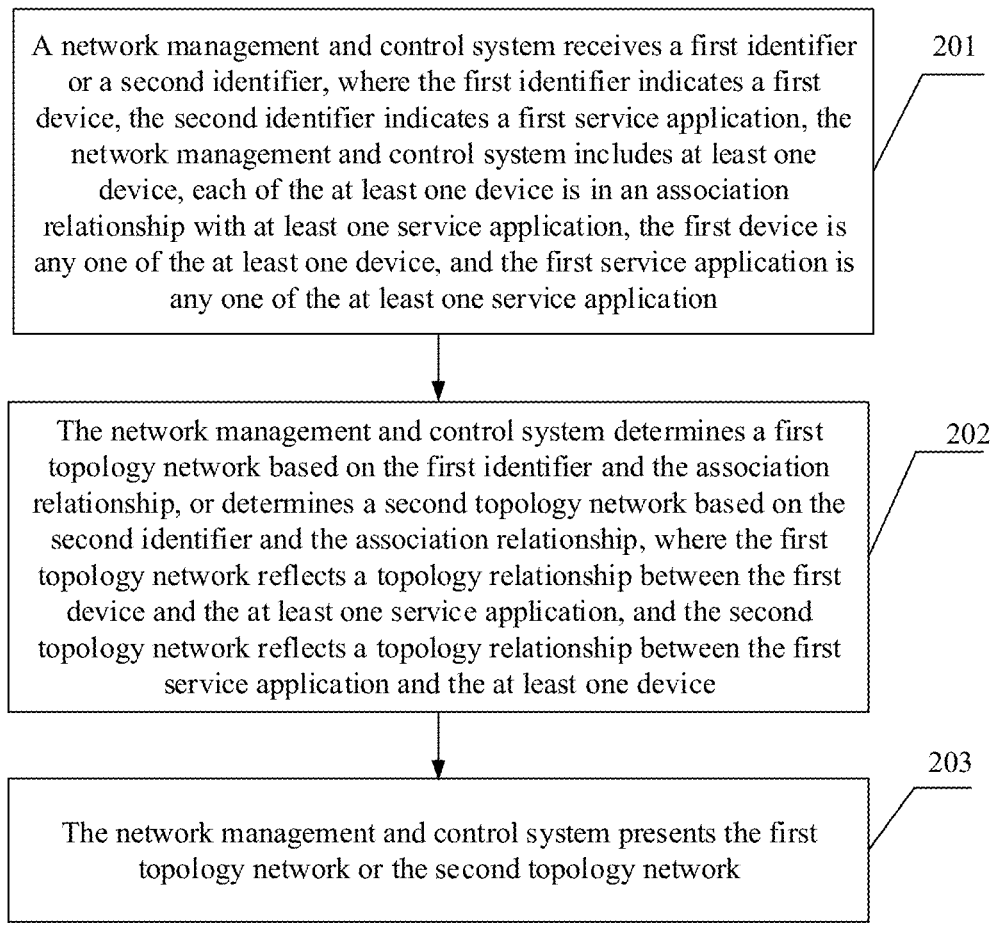
FIG. 2 is a schematic diagram of an embodiment of a service processing method according to an embodiment of the present disclosure.

However, in a related technology, the network operation and maintenance personnel cannot clearly learn, based on global physical networking, a service application carried on each device, and large operation and maintenance difficulty is caused. Therefore, to make it convenient for the network operation and maintenance personnel to implement operation and maintenance from a perspective of a local network, a single device, or a single service application, and reduce the operation and maintenance difficulty, FIG. 2 is a schematic diagram of an embodiment of a service processing method according to an embodiment of the present disclosure. As shown in FIG. 2, the service processing method may be applied to a network management and control system, and the method may include the following steps.

201: A network management and control system receives a first identifier or a second identifier, where the first identifier indicates a first device, the second identifier indicates a first service application, the network management and control system includes at least one device, each of the at least one device is in an association relationship with at least one service application, the first device is any one of the at least one device, and the first service application is any one of the at least one service application.

This is understood as: Network operation and maintenance personnel can implement partial network operation and management from a perspective of a device, and can also implement partial network operation and management from a perspective of a service application. If operation and maintenance is implemented from the perspective of the device, the network management and control system may receive the first identifier that can indicate the first device, such as a media storage control (MAC) address and a model of the first device, to determine a device that is in the at least one device in the network management and control system and that needs to be operated and maintained by the network operation and maintenance personnel. In addition, performing operation and maintenance on the first device may be understood as: presenting or monitoring one or more service applications carried on the first device, or monitoring a network resource status in the first device, for example, a network configuration such as virtual routing forwarding (VRF) and a bridge-domain (BD) related to the first device.

Similarly, if operation and maintenance is performed from the perspective of the service application, the network management and control system may receive the second identifier that can indicate the first service application, such as an application name of the first service application, a service application that is in the at least one service application in the network management and control system and that needs to be operated and maintained by the network operation and maintenance personnel. In addition, performing operation and maintenance on the first service application may be understood as: presenting or monitoring one or more devices that are in an association relationship with the first service application.

In addition, the association relationship described above may be understood as a relationship between the at least one device and the at least one service application, and can represent that each of the at least one device can carry the at least one service application, or each of the at least one service application can be carried on at least one device.

For example, the network management and control system may receive the first identifier or the second identifier in the following manner: receiving a first operation instruction on the first device, to obtain the first identifier; or receiving a second operation instruction on the first service application, to obtain the second identifier.

In other words, during operation and maintenance from the perspective of the device, the network operation and maintenance personnel may perform an operation on the first device, such as tapping or double tapping, so that after receiving the first operation instruction on the first device, the network management and control system can obtain, through parsing, the first identifier carried in the first operation instruction. Similarly, when operation and maintenance is performed from the perspective of the service application, the network operation and maintenance personnel may also perform an operation on the first service application, such as tapping, double tapping, or hovering on the first service application for time greater than a preset time threshold, so that after receiving the second operation instruction on the first service application, the network management and control system can obtain, through parsing, the second identifier carried in the second operation instruction.

202: The network management and control system determines a first topology network based on the first identifier and the association relationship, or determines a second topology network based on the second identifier and the association relationship, where the first topology network reflects a topology relationship between the first device and the at least one service application, and the second topology network reflects a topology relationship between the first service application and the at least one device.

Because the association relationship can represent a relationship between the at least one device and the at least one service application, and the first identifier indicates the first device, it indicates that the network operation and maintenance personnel need to perform operation and maintenance on the first device. Therefore, after receiving the first identifier, the network management and control system can determine the first topology network based on the first identifier and the association relationship, so that the first topology network can reflect the topology relationship between the first device and the at least one service application. In an embodiment, the network management and control system searches for and determine the topology relationship between the at least one service application carried on the first device and the first device in global physical networking based on the first identifier and the association relationship.

Figure 3:
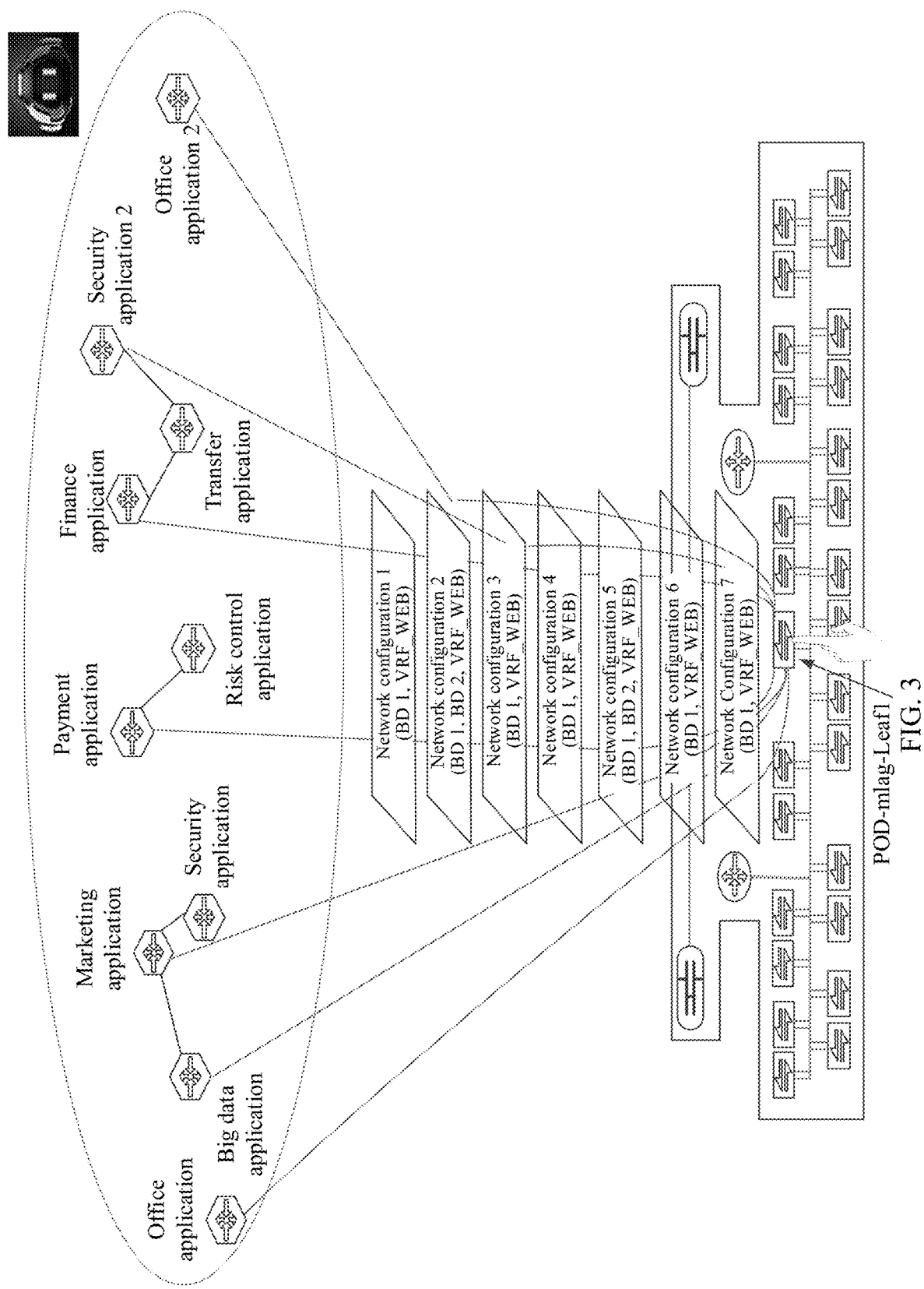
FIG. 3 is a schematic diagram of implementing operation and maintenance from a perspective of a first device according to an embodiment of the present disclosure.

For example, FIG. 3 is a schematic diagram of implementing operation and maintenance from the perspective of the first device according to an embodiment of the present disclosure. It can be learned from FIG. 3 that, assuming that the first device is "POD-mlag-Leaf1", and the network operation and maintenance personnel need to perform operation and maintenance on the "POD-mlag-Leaf1" device, the network operation and maintenance personnel may tap the "POD-mlag-Leaf1" device on a display interface of the network management and control system. In this way, the first topology network, that is, a topology network between the "POD-mlag-Leaf1" device and the at least one service application that is in the association relationship, may be presented on the display interface of the network management and control system, for example, a topology network between the "POD-mlag-Leaf1 device" and the office application, the marketing application, the finance application, the security application 2, the payment application, the big data application, or the office application 2.

It should be understood that FIG. 3 is merely an example description. In actual application, the topology network between the "POD-mlag-A" device and the payment application, the marketing application 1, the finance application 2, or the office application 3 may be specifically used. This is not limited herein.

For example, the first topology network further reflects a network resource status of the first device, such as a network configuration such as a VRF and a BD, and a network configuration at each layer corresponds to a corresponding service application. As shown in FIG. 3, for the "POD-mlag-Leaf1" device, the display interface of the network management and control system may further display a seven-layer network configuration corresponding to the "POD-mlag-Leaf1" device, such as a network configuration 1 to a network configuration 7. Each layer of network configuration corresponds to one service application. In addition, as shown in FIG. 3, service applications corresponding to network configurations at all layers from bottom to top are respectively an office application, a big data application, a marketing application, a payment application, a finance application, a security application 2, and an office application 2. The network configuration 1 may include, but is not limited to, a BD 1 and a VRF_WEB, the network configuration 2 may include, but is not limited to, a BD 1, a BD 2, and a VRF_WEB, the network configuration 3 may include, but is not limited to, a BD 1 and a VRF_WEB, the network configuration 4 may include, but is not limited to, a BD 1 and a VRF_WEB, the network configuration 5 may include, but is not limited to, a BD 1, a BD 2, and a VRF_WEB, the network configuration 6 may include, but is not limited to, a BD 1 and a VRF_WEB, and the network configuration 7 may include, but is not limited to, a BD 1 and a VRF_WEB. This is not specifically limited in the present disclosure. In the foregoing manner, operation and maintenance is performed from the perspective of the first device, so that not only operation and maintenance of a local network is implemented in a global network, but also a specific service application carried on each device can be clearly learned, to avoid unavailability of service applications carried on all devices due to comprehensive network upgrade. In addition, a network resource status of the device can be learned, so that a root cause of a fault, a traffic exception status, and the like can be traced based on the network resource status when an exception occurs.

Similarly, because the second identifier indicates the first service application, it indicates that the network operation and maintenance personnel need to perform operation and maintenance on the first service application. In this case, for operation and maintenance from the perspective of the first service application, after receiving the second identifier, the network management and control system can determine the second topology network based on the second identifier and the association relationship, so that the second topology network can reflect the topology relationship between the first service application and the at least one device. In an embodiment, the network management and control system searches for and determine the topology relationship between the first service application and the at least one device in global physical networking based on the second identifier and the association relationship.

Figure 4:
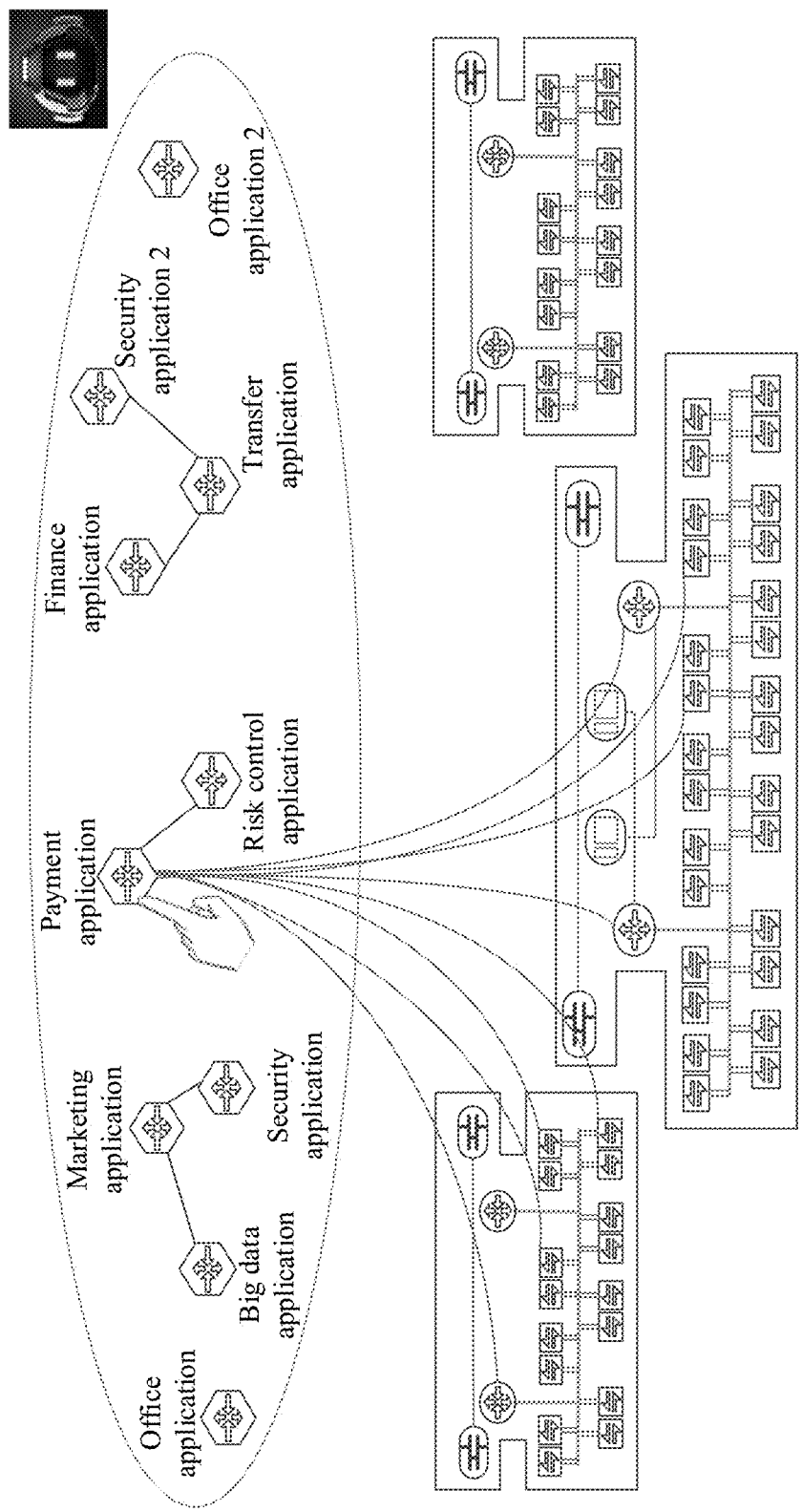
FIG. 4 is a schematic diagram of implementing operation and maintenance from a perspective of a first service application according to an embodiment of the present disclosure.

For example, FIG. 4 is a schematic diagram of implementing operation and maintenance from the perspective of the first service application according to an embodiment of the present disclosure. It can be learned from FIG. 4 that, assuming that the first service application is a "payment application", and the network operation and maintenance personnel need to perform operation and maintenance on the "payment application", the network operation and maintenance personnel may perform a tap operation on the "payment application" on the display interface of the network management and control system. In this way, the second topology network, that is, a topology network between the "payment application" and the at least one device that is in the association relationship, may be presented on the display interface of the network management and control system, for example, a topology network between the "payment application" and a device such as a core switch 1, an edge switch 1, a core switch 2, a core switch 3, or an edge switch 2 or a device such as an edge switch 3, an edge switch 4, or an edge switch 5. In this way, not only operation and maintenance of a local network is implemented in a global network, but a capability of implementing operation and maintenance from the perspective of the service application is also provided. This efficiently helps the network operation and maintenance personnel control a single service application in a panoramic manner and reduces operation and maintenance difficulty.

It should be understood that FIG. 4 is merely an example description. In an embodiment, a topology network between a "finance application" and a device such as an edge switch 1, a router 3, or a core switch 4. This is not limited herein.

203: The network management and control system presents the first topology network or the second topology network.

In this embodiment, after determining the first topology network or the second topology network, the network management and control system may present the first topology network or the second topology network, so that the network operation and maintenance personnel clearly know a service application carried on the first device, or efficiently help the network operation and maintenance personnel control a single service application in a panoramic manner.

It should be understood that, that the network management and control system presents the first topology network may be understood with reference to the content described in FIG. 3, and that the network management and control system presents the second topology network may be understood with reference to the content described in FIG. 4. Details are not described herein again.

In addition, based on the embodiment described in FIG. 2, a single service application may be monitored and presented in a visual view. Therefore, in some other embodiments, the service processing method may further include: obtaining an application layer parameter, a logical layer parameter, an overlay layer parameter, and a physical layer parameter for the first service application; and respectively presenting an application layer view, a logical layer view, an overlay layer view, and a physical layer view based on the application layer parameter, the logical layer parameter, the overlay layer parameter, and the physical layer parameter, where the application layer view is used to reflect service information of at least one business service in the first service application, the logical layer view is used to reflect network resource information of the first service application, the overlay layer view is used to reflect a traffic flow status of the at least one business service, and the physical layer view is used to reflect the second topology network.

In this embodiment, each service application may be abstracted into four layers, and a corresponding service application is presented by using four layers. It may be understood that the four layers described above may include the application layer view, the logical layer view, the overlay layer view, and the physical layer view, and elements in the application layer view, the logical layer view, the overlay layer view, and the physical layer view can form a cascading relationship, to punch the entire service application. Further, the overlay layer view may be understood as a view that carries functions and capabilities of the application layer view, the logical layer view, and the physical layer view.

Therefore, when the network operation and maintenance personnel want to monitor the first service application and present the first service application in a visual view, the first service application may be abstracted into four layers, to monitor and present the first service application, and facilitate comprehensive operation and maintenance from a perspective of the first service application. In an embodiment, the network management and control system may obtain the application layer parameter, the logical layer parameter, the overlay layer parameter, and the physical layer parameter, and respectively present the application layer view, the logical layer view, the overlay layer view, and the physical layer view based on the application layer parameter, the logical layer parameter, the overlay layer parameter, and the physical layer parameter.

In this way, service information of at least one business service in the first service application can be reflected by the application layer view, such as basic information of the business service or an interworking relationship between business services in the at least one business service; network resource information of the first service application can be reflected by the logical layer view, such as information about an accessed subnet, information about an IP bearer network, or information about an internal core network; and a traffic flow status of at least one business service is reflected by the overlay layer view, to facilitate subsequent monitoring of the first service application, packet capturing and traffic counting of a business service port, and the like. Reflecting the second topology network in the physical layer view is understood as presenting, in the physical layer view, at least one device in an association relationship with the first service application, to further perform operation and maintenance from the perspective of the device and present device information of each device associated with the first service application.

Figure 5:
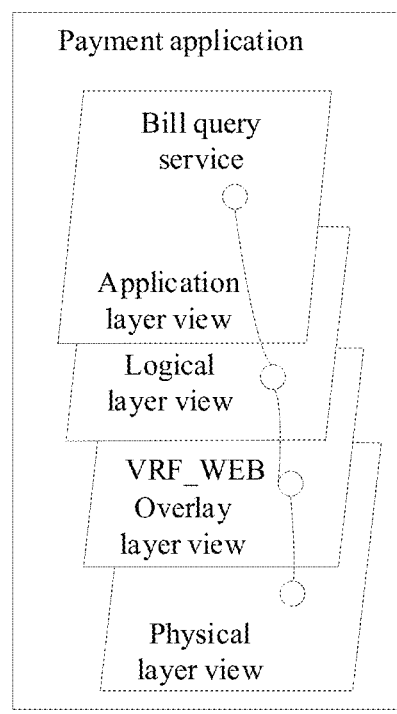
FIG. 5 is a schematic diagram of four layers of a first service application according to an embodiment of the present disclosure.

For example, FIG. 5 is a schematic diagram of four layers in the first service application according to an embodiment of the present disclosure. It can be learned from FIG. 5 that, a payment application may be visually presented by using an application layer view, a logical layer view, and an overlay layer view. In addition, there is a mapping relationship between an element in the application layer view and an element in the logical layer view, there is also a mapping relationship between the element in the logical layer view and an element in the overlay layer view, and there is a mapping relationship between the element in the overlay layer view and an element in the physical layer view, to punch the entire payment application.

It may be understood that each layer in the payment application may reflect different content of the payment application. This is separately understood below with reference to accompanying drawings.

Figure 6:
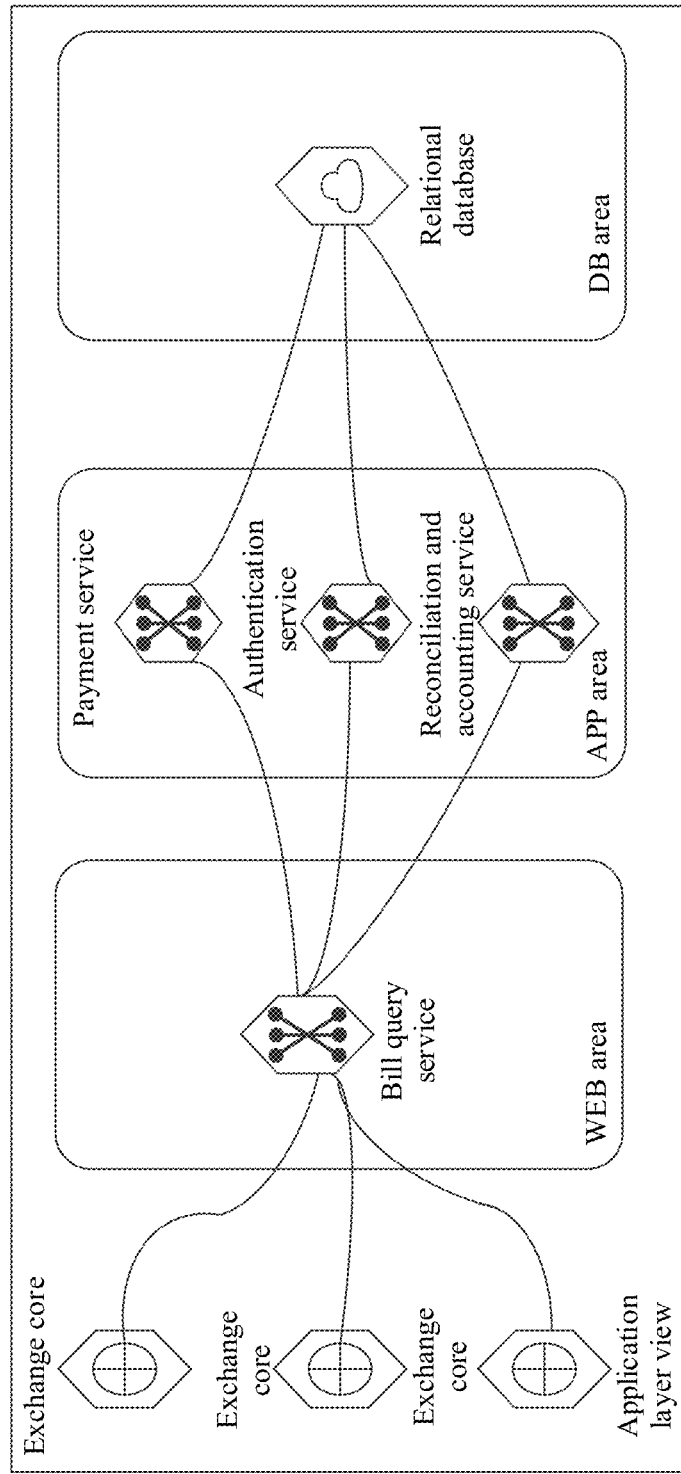
FIG. 6 is a schematic diagram of an application layer view according to an embodiment of the present disclosure.

For the application layer view, refer to FIG. 6. FIG. 6 is a schematic diagram of the application layer view according to an embodiment of the present disclosure. It can be learned from FIG. 6 that at least one business service such as a bill query service, a payment service, an authentication service, or a reconciliation and accounting service included in the payment application can be intuitively displayed by using the application layer view, and in addition, an interworking relationship between the bill query service, the payment service, the authentication service, the reconciliation and accounting service, and the like or a relationship between the foregoing business service and a relational database can be intuitively viewed from the application layer view, to trace, from a specific business service, another business service associated with the business service. In this way, global control is performed on the payment application. It should be understood that the bill query service, the payment service, the authentication service, or the reconciliation and accounting service described in FIG. 6 is merely an example description. In an embodiment, in actual application, another business service may be further included. This is not limited herein.

It should be understood that the network operation and maintenance personnel may perform an update operation such as business service expansion or offline on the application layer view in the first service application based on an operation and maintenance requirement.

Therefore, in some embodiments, the service processing method may further include obtaining service update information; and updating, in the application layer view, a business service in the first service application based on the service update information. It may be understood that the service update information described above may include, but is not limited to, service port expansion information, service network segment expansion information, service port offline information, and the like. This is not specifically limited in this embodiment of the present disclosure. In addition, the obtaining the capacity expansion information such as the service port capacity expansion information and the service network segment capacity expansion information may also be obtaining the capacity expansion information when traffic of the first service application does not support an access amount. In an embodiment, a condition for obtaining the service update information is not limited in this embodiment of the present disclosure. For example, based on FIG. 6, the service port expansion information may be obtained, and a business service such as an "external account service" obtained after expansion is presented in the application layer view of the payment application.

Figure 7:
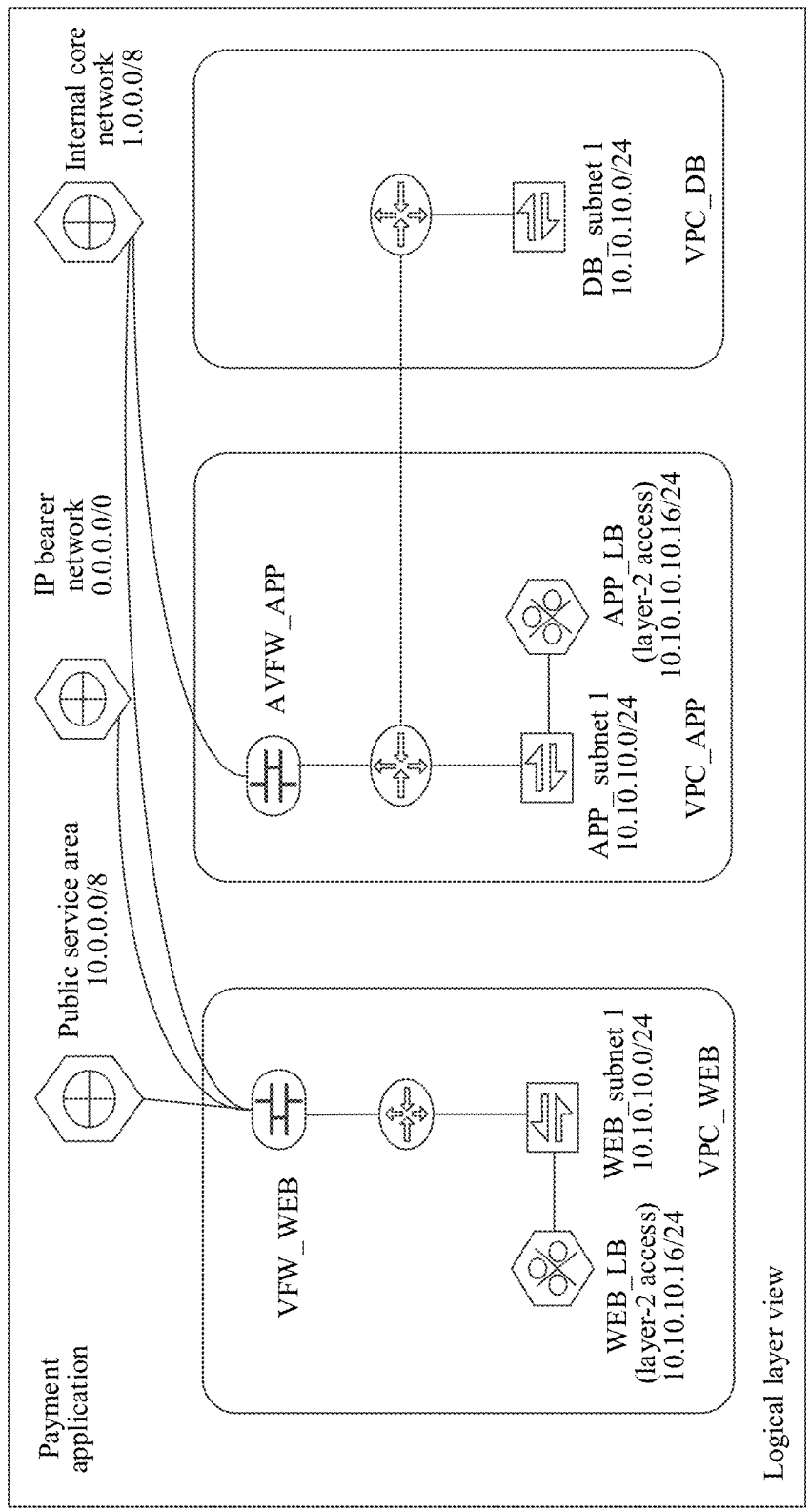
FIG. 7 is a schematic diagram of a logical layer view according to an embodiment of the present disclosure.

For the logical layer view, refer to FIG. 7. FIG. 7 is a schematic diagram of a logical layer view according to an embodiment of the present disclosure. It can be learned from FIG. 7 that a logical network corresponding to the payment application and a relationship between logical elements in the logical network, such as a relationship between logical elements such as an edge switch, a core switch, an Internet Protocol (IP) bearer network, a layer-2 access device, and an internal core network, may be intuitively presented by using the logical layer view. In addition, corresponding network resource information such as information about an accessed subnet, information about an IP bearer network, and information about an internal core network is also presented. This enables the network operation and maintenance personnel to intuitively know a logical network in the payment application and helps perform operation and maintenance from a perspective of a logical network model. It should be understood that in the logical layer view, the network operation and maintenance personnel may also directly enter a virtual private cloud (VPC) design state based on a requirement, so that the network management and control system can update the logical model and the like when obtaining a VPC design parameter entered by the network operation and maintenance personnel.

Figure 8:
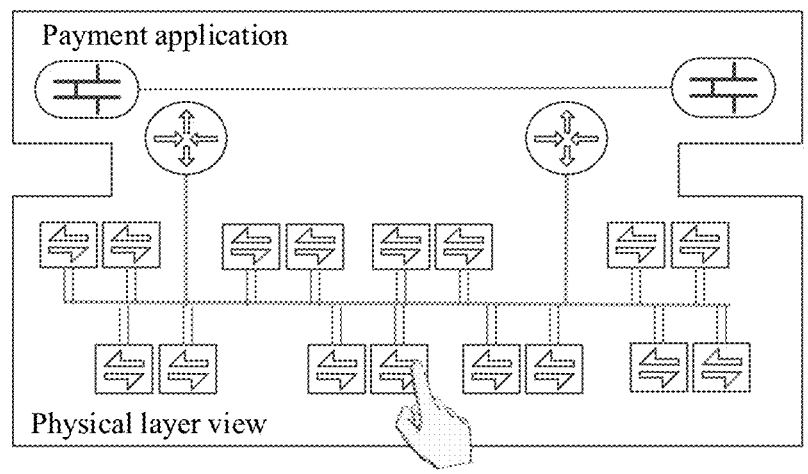
FIG. 8 is a schematic diagram of a physical layer view according to an embodiment of the present disclosure.

For the physical layer view, refer to FIG. 8. FIG. 8 is a schematic diagram of the physical layer view according to an embodiment of the present disclosure. It can be learned from FIG. 8 that, a physical network corresponding to the payment application, that is, a physical connection between at least one device that is in an association relationship with the payment application can be intuitively presented by using the physical layer view, and the foregoing second topology network can be intuitively presented, to implement operation and maintenance from a perspective of a physical network model.

In addition, it should be understood that, because the physical layer view can reflect the physical network corresponding to the payment application, operation and maintenance may be further directly performed from a perspective of a device, so that detailed device information of a specific device in one or more devices that are in an association relationship with the payment application, a carried service application, a mapping element, or the like can be presented.

Figure 9:
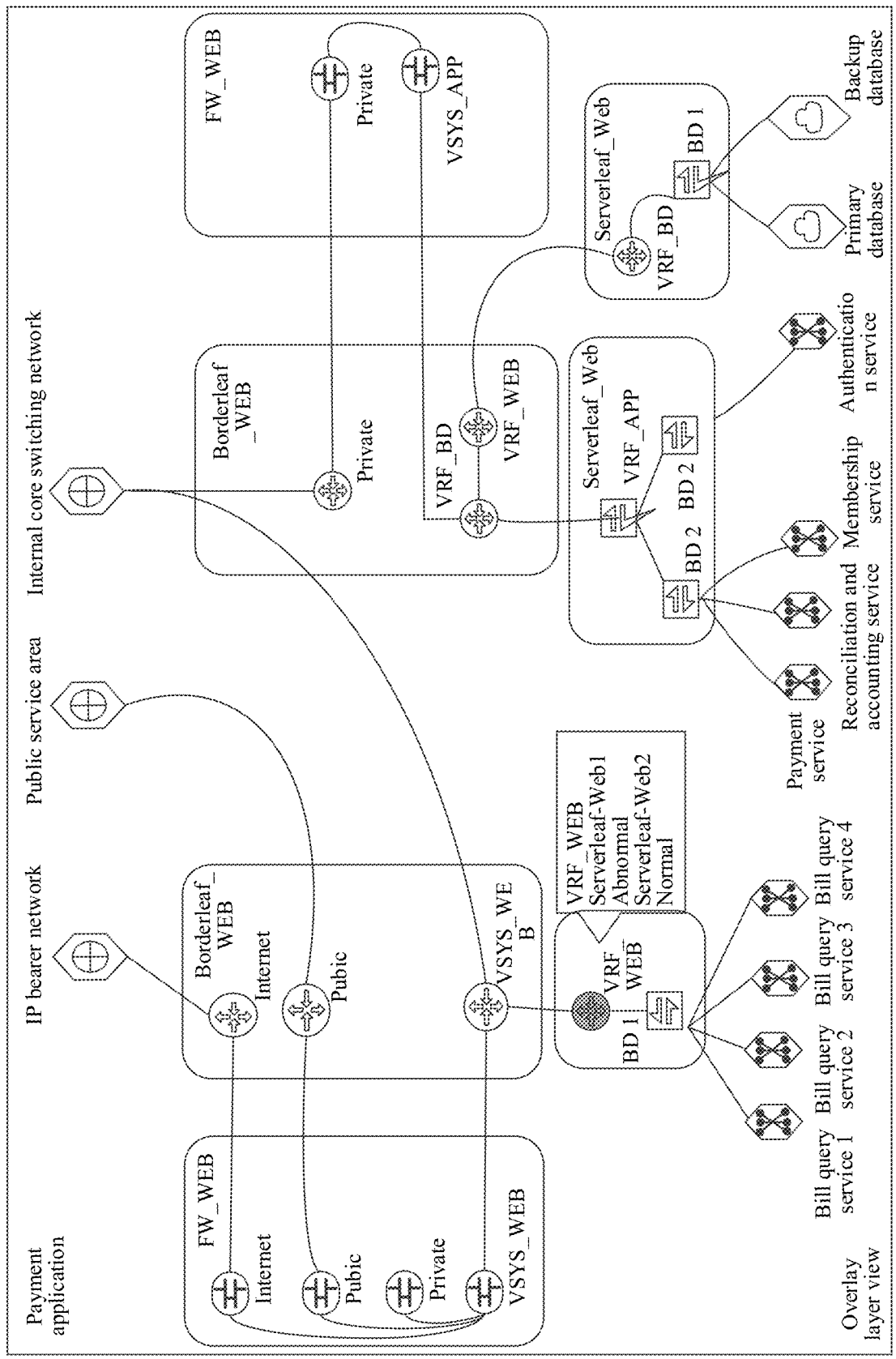
FIG. 9 is a schematic diagram of an overlay layer view according to an embodiment of the present disclosure.

Further, for the overlay layer view, refer to FIG. 9. FIG. 9 is a schematic diagram of the overlay layer view according to an embodiment of the present disclosure. It can be learned from FIG. 9 that a traffic flow status corresponding to each business service in the payment application can be intuitively presented by using the overlay layer view. For example, traffic requested by a bill query service 1 needs to be allocated from an IP bearer network, a public service area, and an internal core switching network, and is forwarded by a device such as a core switch or an edge switch. Through the foregoing overlay layer view, the network operation and maintenance personnel can clearly know a source, a destination, or the like of traffic of each business service in the payment application.

In addition, when an exception occurs on the traffic of the first service application, to help the network operation and maintenance personnel quickly query and locate a traffic exception path when the exception occurs on the traffic, in some other embodiments, the service processing method may further include: highlighting the traffic exception path in the overlay layer view. For example, based on the foregoing descriptions in FIG. 9, the network management and control system may highlight (for example, a gray shadow part) the traffic exception path "VRF_WEB, Serverleaf-Web1, abnormal" in the overlay layer view, so that the network operation and maintenance personnel can clearly learn the traffic exception path in the payment application.

Optionally, in some other embodiments, to help the network operation and maintenance personnel comprehensively know and observe the four layers in the first service application, the layers in the first service application may be rotated.

Figure 10:
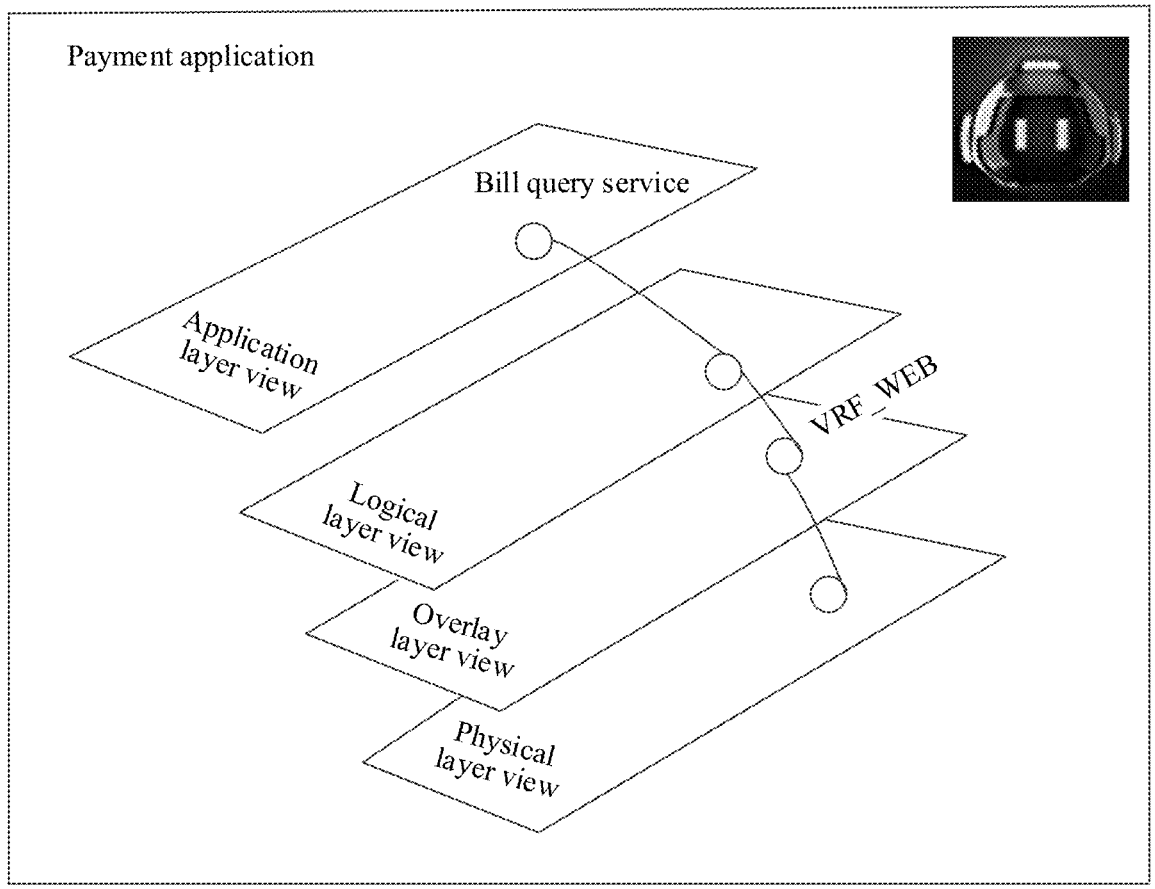
FIG. 10 is a schematic diagram of rotating four layers in a first service application according to an embodiment of the present disclosure.

In an embodiment, after the respectively presenting an application layer view, a logical layer view, an overlay layer view, and a physical layer view based on the application layer parameter, the logical layer parameter, the overlay layer parameter, and the physical layer parameter, the method further includes: rotating the application layer view, the logical layer view, the overlay layer view, and the physical layer view based on a preset three-dimensional model; or determining a rotation angle based on angle information of the application layer view, the logical layer view, the overlay layer view, and the physical layer view, and rotating the application layer view, the logical layer view, the overlay layer view, and the physical layer view based on the rotation angle. FIG. 10 is a schematic diagram of rotating the four layers in the first service application according to an embodiment of the present disclosure. It can be learned from FIG. 10 that, after the four layers in the payment application presented in FIG. 5 are rotated in a counterclockwise manner, the four layers presented in FIG. 10 may be obtained. It may be understood that a presented rotation angle, rotation direction, and the like may be determined based on a requirement of performing a rotation operation on the foregoing intelligent body device by the network operation and maintenance personnel. This is not specifically limited in this embodiment of the present disclosure.

Optionally, in some other embodiments, after the presenting a first topology network based on the first identifier and the association relationship or presenting a second topology network based on the second identifier and the association relationship, the service processing method may further include: obtaining the network resource status of the first device, where there is the association relationship between the first device and the first service application; and displaying a traffic exception status of the first service application when the network resource status of the first device changes, where the traffic exception status includes a traffic exception path.

It may be understood that, in a network freezing phase, to learn a traffic change status of a service application that is focused on in the network freezing phase, for example, in a promotion period such as Double Eleven shopping carnival or June 18 shopping carnival, the payment application needs to be focused on, the network management and control system needs to obtain the network resource status of the first device that is in the association relationship with the first service application, and determine whether the network resource status of the first device changes, and if the network resource status of the first device changes, displays the traffic exception status of the first service application, and notifies the network operation and maintenance personnel of the traffic exception status by using the intelligent body device. In an embodiment, for the determining whether the network resource status of the first device changes, the network management and control system may compare a current Address Resolution Protocol (ARP) entry, a current network configuration, and the like in the first device with a preset ARP entry and a preset network configuration, and if the current ARP entry and the current network configuration do not match the preset ARP entry and the preset network configuration, the network management and control system may determine that the network resource status of the first device has changed or is abnormal. It should be noted that, in actual application, another determining manner may alternatively be used. This is not specifically limited in this embodiment of the present disclosure. In addition, a service application that is focused on may be determined based on information such as an access amount. This is not specifically limited in this embodiment of the present disclosure.

It should be understood that the traffic exception status may include the traffic exception path.

Figure 11:
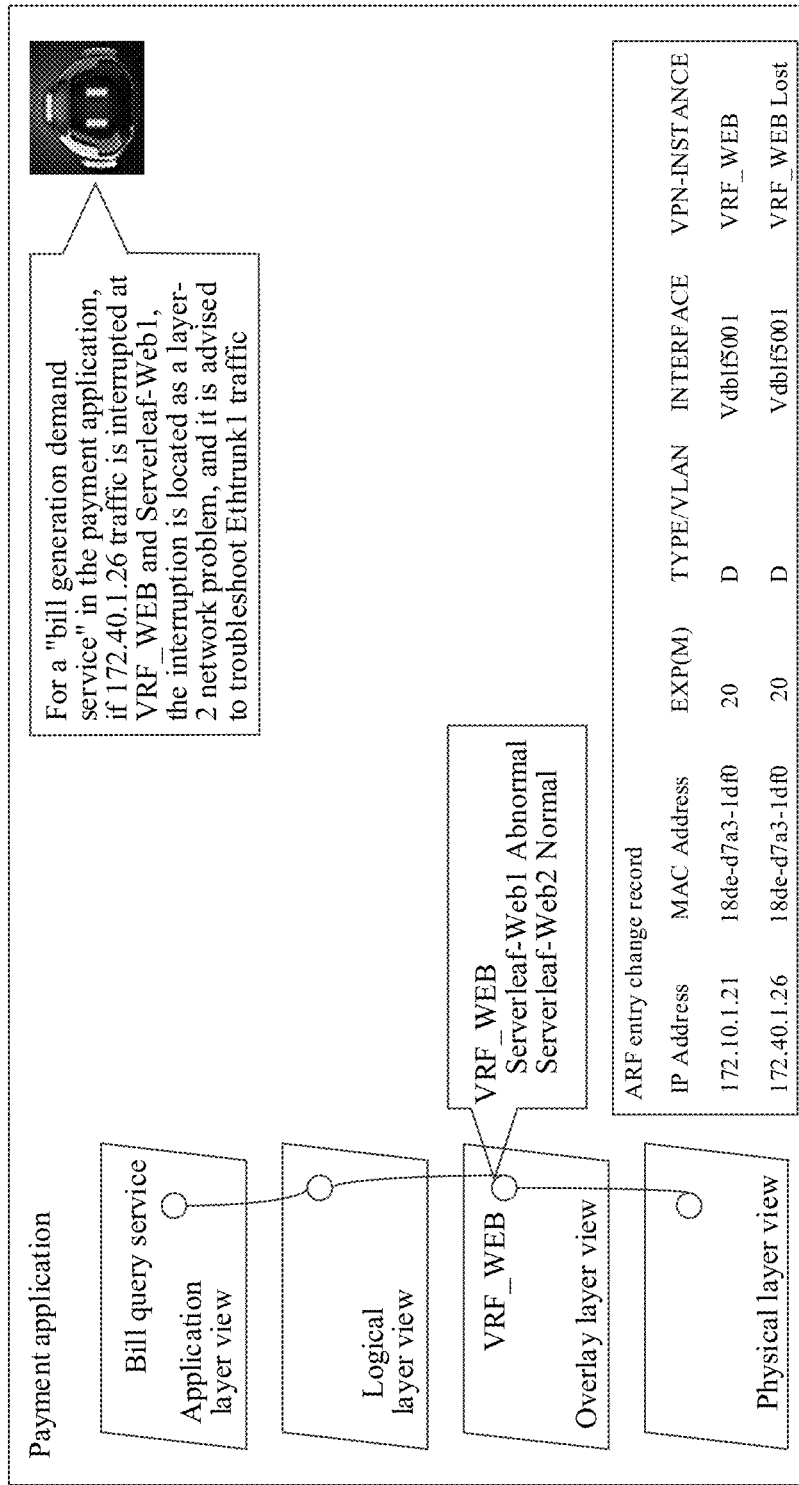
FIG. 11 is a schematic diagram of displaying a traffic exception status according to an embodiment of the present disclosure.

For example, FIG. 11 is a schematic diagram of displaying the traffic exception status according to an embodiment of the present disclosure. It can be learned from FIG. 11 that, for the payment application, in an ARP entry change history in the first device that is in the association relationship with the payment application, it can be obviously learned that the traffic exception status includes: an entry corresponding to "an IP address "172.40.1.26" and a MAC address "18ded7a3-1df1"" is lost, and a corresponding traffic exception path may be "VRF_WEB, Serverleaf-Web1". In addition, the intelligent body device also presents a locating status of the loss of the entry corresponding to "an IP address "172.40.1.26" and a MAC address "18de-d7a3-1df1"". For example, for a "bill generation demand service" in the payment application, if 172.40.1.26 traffic is interrupted at VRF_WEB and Serverleaf-Web1, the interruption is located as a layer-2 network problem, and it is advised to troubleshoot Ethtrunk1 traffic.

Optionally, in some other embodiments, when the network status of the at least one device is abnormal, the network management and control system may further perform troubleshooting on a device on which an exception occurs. In an embodiment, the method further includes: monitoring a network status of the at least one device; when a device whose network status is abnormal exists in the at least one device, determining a fault status of the device whose network status is abnormal; and determining an exception handling policy based on the fault status of the device whose network status is abnormal.

In the embodiment, the fault status may include a fault type, a fault cause, or the like, and the exception handling policy may include, but is not limited to, switching an optical link, replacing an optical module, or the like. For example, when the network management and control system continuously monitors the network status of the at least one device, if the network management and control system finds that a fault type of the device whose network status is abnormal is an optical link fault, the network management and control system evaluates bandwidth utilization of each backup optical link in the device whose network status is abnormal, and if the bandwidth utilization of each backup optical link is greater than preset bandwidth utilization, the network management and control system may determine that the exception handling policy is: switching the optical link. It may be understood that, when the bandwidth utilization of each backup optical link is less than the preset bandwidth utilization, or the backup optical link is overloaded, the network management and control system recommends another exception handling policy, for example, changing an optical module. This is not specifically limited in this embodiment.

Figure 12:
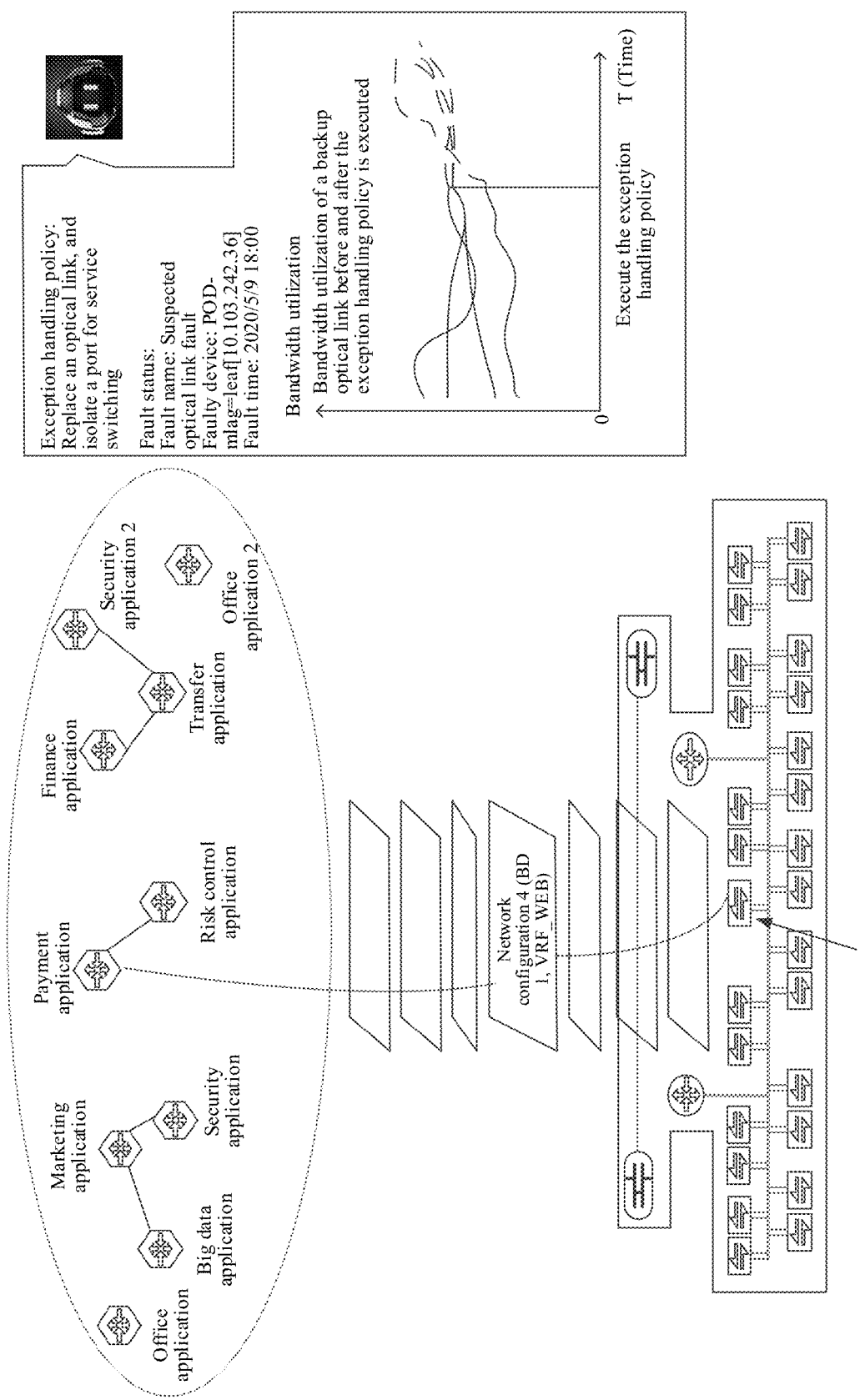
FIG. 12 is a schematic diagram of fault monitoring according to an embodiment of the present disclosure.

For example, FIG. 12 is a schematic diagram of fault monitoring according to an embodiment of the present disclosure. It can be learned from FIG. 12 that, the network management and control system may display a fault status by using the intelligent body device, for example, a faulty device: POD-mlag-leaf[10.136.242.36], a fault type: suspected optical link fault, and fault time: 2020/5/9 18:00; and may further display an exception handling policy: changing an optical link and isolating a port for service switching. Further, bandwidth utilization of a backup optical link before and after the network management and control system executes the exception processing policy may be further presented. Apparently, the bandwidth utilization of the backup optical link after the exception processing policy is executed is higher than the bandwidth utilization of the backup optical link before the exception processing policy is executed.

It should be noted that FIG. 5 to FIG. 12 are merely described by using an example in which the first service application is the payment application. In actual application, the first service application may alternatively be another service application, for example, a finance application or a security application. This is not limited herein.

In this embodiment of the present disclosure, not only partial operation and maintenance can be implemented from a perspective of a device, and a specific service application carried on each device can be clearly learned, to avoid unavailability of service applications carried on all devices due to comprehensive network upgrade, but operation and maintenance can also be implemented from a perspective of a service application, to efficiently help network operation and maintenance personnel control a single service application in a panoramic manner, and reduce operation and maintenance difficulty.

The solutions provided in embodiments of the present disclosure are mainly described above from a perspective of the method. It may be understood that, to implement the foregoing functions, the network management and control system includes corresponding hardware structures and/or software modules for performing the functions. A person skilled in the art should be easily aware that, in combination with the functions described in embodiments disclosed in this specification, the present disclosure can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present disclosure.

From a perspective of an entity device, the first device may be specifically implemented by one entity device, or may be jointly implemented by a plurality of entity devices, or may be a logical functional unit in an entity device. This is not specifically limited in this embodiment of the present disclosure.

Figure 13:
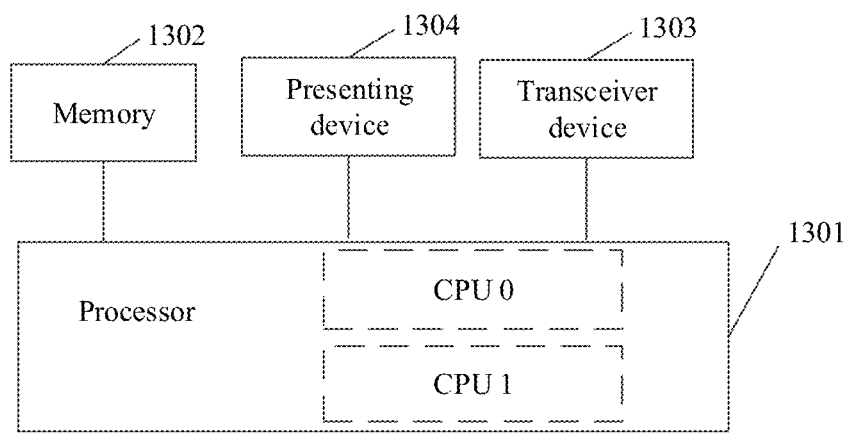
FIG. 13 is a schematic diagram of a hardware structure of a communication device according to an embodiment of the present disclosure.

For example, the first device may be implemented by a communication device in FIG. 13. FIG. 13 is a schematic diagram of a hardware structure of a communication device according to an embodiment of the present disclosure. The communication device includes at least one processor 1301, a memory 1302, a transceiver device 1303, and a presenting device 1304.

The processor 1301 may be a general-purpose central processing unit (CPU), a microprocessor, an application-specific integrated circuit (ASIC), or one or more integrated circuits configured to control program execution of the solutions in the present disclosure. The processor 1301 can determine a first topology network based on a first identifier and an association relationship, or determine a second topology network based on a second identifier and an association relationship, and the like.

The transceiver device 1303 is any apparatus such as a transceiver, and is configured to communicate with another device or a communication network, for example, an Ethernet, a radio access network (RAN), or a wireless local area network (WLAN). The transceiver device 1303 may be connected to the processor 1301. The transceiver device 1303 may receive the first identifier, the second identifier, or the like.

The memory 1302 may be a read-only memory (ROM) or another type of static storage device that can store static information and instructions, or a random-access memory (RAM) or another type of dynamic storage device that can store information and instructions, or may be an electrically erasable programmable read-only memory (EEPROM), a compact disc read-only memory (CD-ROM) or another compact disc storage, an optical disc storage (including a compressed optical disc, a laser disc, an optical disc, a digital versatile disc, a Blu-ray disc, or the like), a magnetic disk storage medium or another magnetic storage device, or any other medium that can be for carrying or storing expected program code in a form of instructions or a data structure and that can be accessed by a computer. However, the memory 1302 is not limited thereto. The memory 1302 may exist independently, or may be connected to the processor 1301. Alternatively, the memory 1302 may be integrated with the processor 1301.

The presenting device 1304 may be connected to the processor 1301, and may be configured to display the first topology network or the second topology network.

The memory 1302 is configured to store computer-executable instructions for performing the solutions in the present disclosure, and the computer-executable instructions are executed under the control of the processor 1301. The processor 1301 is configured to execute the computer-executable instructions stored in the memory 1302, to implement the service processing method provided in the foregoing method embodiments of the present disclosure.

In a possible implementation, the computer-executable instructions in this embodiment of the present disclosure may also be referred to as application program code. This is not specifically limited in this embodiment of the present disclosure.

In a specific implementation, in an embodiment, the processor 1301 may include one or more CPUs, for example, a CPU 0 and a CPU 1 in FIG. 13.

From a perspective of a functional unit, in the present disclosure, the first device may be divided into functional units based on the foregoing method embodiments. For example, each functional unit corresponding to each corresponding function may be obtained through division, or two or more functions may be integrated into one functional unit. The integrated functional unit may be implemented in a form of hardware, or may be implemented in a form of a software functional unit.

Figure 14:
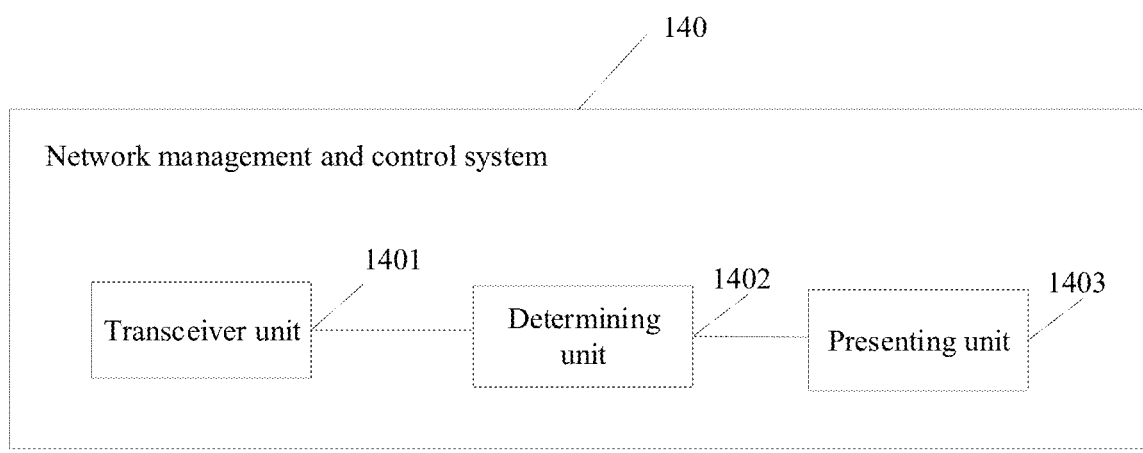
FIG. 14 is a schematic diagram of a structure of a network management and control system according to an embodiment of the present disclosure.

For example, when functional units are obtained through division in an integrated manner, FIG. 14 is a schematic diagram of a structure of a network management and control system according to an embodiment of the present disclosure. As shown in FIG. 14, an embodiment of a network management and control system 140 in the present disclosure may include the following:

The network management and control system 140 includes at least one device, and each of the at least one device is in an association relationship with at least one service application. The network management and control system 140 may include: a transceiver unit 1401 configured to receive a first identifier or a second identifier, where the first identifier indicates a first device, the second identifier indicates a first service application, the first device is any one of the at least one device, and the first service application is any one of the at least one service application; a determining unit 1402 configured to determine a first topology network based on the first identifier received by the transceiver unit 1401 and the association relationship, or determine a second topology network based on the second identifier received by the transceiver unit 1401 and the association relationship, where the first topology network reflects a topology relationship between the first device and the at least one service application, and the second topology network reflects a topology relationship between the first service application and the at least one device; and a presenting unit 1403 configured to present the first topology network or the second topology network.

Optionally, in some embodiments, the transceiver unit 1401 is further configured to obtain an application layer parameter, a logical layer parameter, an overlay layer parameter, and a physical layer parameter for the first service application.

The presenting unit 1403 is configured to respectively present an application layer view, a logical layer view, an overlay layer view, and a physical layer view based on the application layer parameter, the logical layer parameter, the overlay layer parameter, and the physical layer parameter that are obtained by the transceiver unit 1401. The application layer view is used to reflect service information of at least one business service in the first service application, the logical layer view is used to reflect network resource information of the first service application, the overlay layer view is used to reflect a traffic flow status of the at least one business service, and the physical layer view is used to reflect the second topology network.

Optionally, in some embodiments, the first topology network further reflects a network resource status of the first device.

Optionally, in some embodiments, the transceiver unit 1401 is further configured to: after the first topology network is presented based on the first identifier and the association relationship, or the second topology network is presented based on the second identifier and the association relationship, obtain the network resource status of the first device.

The presenting unit 1403 is configured to display a traffic exception status of the first service application when the network resource status of the first device changes. The traffic exception status includes a traffic exception path.

Optionally, in some other embodiments, the presenting unit 1403 is configured to highlight the traffic exception path in the overlay layer view.

Optionally, in some other embodiments, the network management and control system 140 further includes an updating unit.

The transceiver unit 1401 is configured to obtain service update information.

The updating unit is configured to update, in the application layer view, a business service in the first service application based on the service update information obtained by the transceiver unit 1401.

Optionally, in some other embodiments, the network management and control system 140 further includes a monitoring unit.

The monitoring unit is configured to monitor a network status of the at least one device.

The determining unit 1402 is configured to: when a device whose network status is abnormal exists in the at least one device, determine a fault status of the device whose network status is abnormal.

The determining unit 1402 is configured to determine an exception handling policy based on the fault status of the device whose network status is abnormal.

Optionally, in some other embodiments, the transceiver unit 1401 is configured to: receive a first operation instruction on the first device, to obtain the first identifier; or receive a second operation instruction on the first service application, to obtain the second identifier.

Optionally, in some other embodiments, the network management and control system 140 further includes a rotation unit.

The rotation unit is configured to rotate the application layer view, the logical layer view, the overlay layer view, and the physical layer view based on a preset three-dimensional model after the presenting unit 1403 respectively presents the application layer view, the logical layer view, the overlay layer view, and the physical layer view based on the application layer parameter, the logical layer parameter, the overlay layer parameter, and the physical layer parameter; or the determining unit 1402 is configured to determine a rotation angle based on angle information of the application layer view, the logical layer view, the overlay layer view, and the physical layer view; and the rotation unit is configured to rotate the application layer view, the logical layer view, the overlay layer view, and the physical layer view based on the rotation angle determined by the determining unit 1402.

The network management and control system 140 provided in this embodiment of the present disclosure is configured to perform the method in the method embodiments corresponding to FIG. 2 to FIG. 12. For understanding of this embodiment of the present disclosure, refer to related parts in the method embodiments corresponding to FIG. 2 to FIG. 12.

In this embodiment of the present disclosure, the network management and control system 140 is presented in a form of being divided into functional units in an integrated manner. The "functional unit" herein may be an ASIC, a processor and a memory that execute one or more software or firmware programs, an integrated logic circuit, and/or another component that can provide the foregoing functions. In a simple embodiment, a person skilled in the art may figure out that the network management and control system 140 may be in a form shown in FIG. 13.

For example, the processor 1301 in FIG. 13 may invoke the computer-executable instructions stored in the memory 1302, so that the network management and control system 140 performs the method performed by the network management and control system in the method embodiments corresponding to FIG. 2 to FIG. 12.

In an embodiment, functions/implementation processes of the determining unit 1402, the updating unit, the monitoring unit, and the rotation unit in FIG. 14 may be implemented by the processor 1301 in FIG. 13 by invoking the computer-executable instructions stored in the memory 1302. A function/implementation process of the transceiver unit 1401 in FIG. 14 may be implemented by the transceiver device 1303 in FIG. 13. A function/implementation process of the presenting unit 1403 in FIG. 14 may be implemented by the presenting device 1304 in FIG. 13.

In the device in FIG. 13 in the present disclosure, a communication connection is implemented between the components. To be specific, a processing unit (or the processor), a storage unit (or the memory), and a transceiver unit (the transceiver) communicate with each other through an internal connection path, to transfer a control signal and/or a data signal. The foregoing method embodiments of the present disclosure may be applied to the processor, or the steps in the foregoing method embodiments are implemented by the processor. The processor may be an integrated circuit chip with a signal processing capability. In an implementation process, the steps in the foregoing method embodiments can be implemented by using a hardware integrated logical circuit in the processor, or by using instructions in a form of software. The processor may be a CPU, a network processor (NP), a combination of the CPU and the NP, a digital signal processor (DSP), an ASIC, a field-programmable gate array (FPGA) or another programmable logic device, a discrete gate or a transistor logic device, or a discrete hardware component. The processor may implement or perform the methods, the steps, and logical block diagrams that are disclosed in the present disclosure. The general-purpose processor may be a microprocessor, or the processor may be any conventional processor or the like. Steps of the methods disclosed with reference to the present disclosure may be directly performed and completed by a hardware decoding processor, or may be performed and completed by a combination of hardware and software modules in the decoding processor. A software module may be located in a mature storage medium in the art, such as a RAM, a flash memory, a ROM, a programmable ROM (PROM), an EEPROM, or a register. The storage medium is located in the memory, and the processor reads information in the memory and completes the steps in the foregoing methods in combination with hardware of the processor. Although only one processor is shown in the figure, the apparatus may include a plurality of processors, or the processor includes a plurality of processing units. In an embodiment, the processor may be a single-core (single-CPU) processor, or may be a multi-core (multi-CPU) processor.

The memory is configured to store computer instructions executed by the processor. The memory may be a storage circuit, or may be a memory. The memory may be a volatile memory or a nonvolatile memory, or may include the volatile memory and the nonvolatile memory. The nonvolatile memory may be a ROM, a PROM, an erasable PROM (EPROM), an EEPROM, or a flash memory. The volatile memory may be a RAM, and may serve as an external cache. The memory may be independent of the processor, or may be a storage unit in the processor. This is not limited herein. Although only one memory is shown in the figure, the apparatus may alternatively include a plurality of memories, or the memory includes a plurality of storage units.

The transceiver is configured to implement content interaction between the processor and another unit or network element. In an embodiment, the transceiver may be a communication interface of the apparatus, may be a transceiver circuit or a communication unit, or may be a transceiver. Alternatively, the transceiver may be a communication interface of the processor or a transceiver circuit. Optionally, the transceiver may be a transceiver chip. The transceiver may alternatively include a sending unit and/or a receiving unit. In a possible implementation, the transceiver may include at least one communication interface. In another possible implementation, the transceiver may alternatively be a unit implemented in a form of software. In embodiments of the present disclosure, the processor may interact with another unit or network element by using the transceiver. For example, the processor obtains or receives content from another network element by using the transceiver. If the processor and the transceiver are two physically separated components, the processor may exchange content with another unit of the apparatus without using the transceiver.

In a possible implementation, the processor, the memory, and the transceiver may be connected to each other through a bus. The bus may be a Peripheral Component Interconnect (PCI) bus or an Extended Industry Standard Architecture (EISA) bus, or the like. Buses may be classified into an address bus, a data bus, a control bus, and the like.

In embodiments of the present disclosure, words such as "example" or "for example" are used to provide an example, an illustration, or a description. Any embodiment or design scheme described as an "example" or "for example" in embodiments of the present disclosure should not be explained as being more preferred or having more advantages than another embodiment or design scheme. Exactly, use of the word such as "example" or "for example" is intended to present a related concept in a specific manner.

In embodiments of the present disclosure, for ease of understanding, a plurality of examples are used for description. However, these examples are merely examples, but do not mean optimal implementations for implementing the present disclosure.

All or some of the foregoing embodiments may be implemented by using software, hardware, firmware, or any combination thereof. When the software is used for implementation, all or some of embodiments may be implemented in a form of a computer program product.

The computer program product includes one or more computer instructions. When the computer-executable instructions are loaded and executed on a computer, the procedures or the functions according to embodiments of the present disclosure are all or partially generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable mediums. The usable medium may be a magnetic medium (for example, a floppy disk, a hard disk, or a magnetic tape), an optical medium (for example, a digital video disc (DVD)), a semiconductor medium (for example, a solid-state disk (SSD)), or the like.

The technical solutions provided in the present disclosure are described in detail above. The principle and implementations of the present disclosure are described herein by using specific examples. The descriptions about embodiments are merely provided to help understand the method and core ideas of the present disclosure. In addition, a person of ordinary skill in the art can make variations to the present disclosure in terms of the specific implementations and application scopes based on the ideas of the present disclosure. Therefore, the content of this specification shall not be construed as a limitation to the present disclosure.

What is claimed is:

1. A method, comprising:
  receiving a first identifier or a second identifier, wherein the first identifier indicates a first device of a plurality of devices of a network management and control system, and wherein the second identifier indicates a first service application of a plurality of service applications;

displaying, in response to receiving the first identifier of the first device and based on the first identifier of the first device and association relationships between the plurality of devices and the plurality of service applications, a first topology network, wherein the first topology network reflects a first topology relationship between the first device and a first portion of the plurality of service applications, wherein the first device carries the first portion of the plurality of service applications, and wherein the first topology network displays first graphical representations of the first device, the first portion of the plurality of service applications, and first indications that the first device carries the first portion of the plurality of service applications; and displaying, in response to receiving the second identifier of the first service application and based on the second identifier of the first service application and the association relationships, a second topology network, wherein the second topology network reflects a second topology relationship between the first service application and a second portion of the plurality of devices, wherein the second portion of the plurality of devices carries the first service application, and wherein the second topology network displays second graphical representations of the first service application, the second portion of the plurality of devices, and second indications that the second portion of the plurality of devices carries the first service application.

2. The method of claim 1, further comprising:
obtaining an application layer parameter, a logical layer parameter, an overlay layer parameter, and a physical layer parameter for the first service application; and
presenting an application layer view, a logical layer view, an overlay layer view, and a physical layer view that are respectively based on the application layer parameter, the logical layer parameter, the overlay layer parameter, and the physical layer parameter, wherein the application layer view reflects service information of at least one business service in the first service application, the logical layer view reflects network resource information of the first service application, the overlay layer view reflects a traffic flow status of the at least one business service, and the physical layer view reflects the second topology network.

3. The method of claim 2, wherein the first topology network further reflects a network resource status of the first device.

4. The method of claim 3, wherein after displaying the first topology network or the second topology network, the method further comprises:
obtaining the network resource status of the first device; and
displaying a traffic exception status of the first service application when the network resource status of the first device changes, wherein the traffic exception status comprises a traffic exception path.

5. The method of claim 4, wherein displaying the traffic exception status comprises highlighting the traffic exception path in the overlay layer view.

6. The method of claim 2, further comprising:
obtaining service update information; and updating, in the application layer view, a business service in the first service application based on the service update information.

7. The method of claim 1, further comprising:
monitoring a network status of the plurality of devices;
obtaining a fault status of a device in the plurality of devices when the network status of the device is abnormal; and
identifying an exception handling policy based on the fault status.

8. The method of claim 1, wherein receiving the first identifier or the second identifier comprises:
receiving a first operation instruction on the first device to obtain the first identifier; or
receiving a second operation instruction on the first service application to obtain the second identifier.

9. The method of claim 2, wherein after presenting the application layer view, the logical layer view, the overlay layer view, and the physical layer view, the method further comprises:
rotating the application layer view, the logical layer view, the overlay layer view, and the physical layer view based on a preset three-dimensional model; or
obtaining a rotation angle based on angle information of the application layer view, the logical layer view, the overlay layer view, and the physical layer view, and rotating the application layer view, the logical layer view, the overlay layer view, and the physical layer view based on the rotation angle.

10. An apparatus, comprising:
a memory configured to store instructions; and
one or more processors coupled to the memory and configured to execute the instructions to cause the apparatus to:
receive a first identifier or a second identifier, wherein the first identifier indicates a first device of a plurality of devices of a network management and control system, and wherein the second identifier indicates a first service application of a plurality of service applications;
display, in response to receiving the first identifier of the first device and based on the first identifier of the first identifier and association relationships between the plurality of devices and the plurality of service applications, a first topology network, wherein the first topology network reflects a first topology relationship between the first device and a first portion of the plurality of service applications, wherein the first device carries the first portion of the plurality of service applications, and wherein the first topology network displays first graphical representations of the first device, the first portion of the plurality of service applications, and first indications that the first device carries the first portion of the plurality of service applications; and
display, in response to receiving the second identifier of the first service application and based on the second identifier of the first service application and the association relationships, a second topology network, wherein the second topology network reflects a topology relationship between the first service application and a second portion of the plurality of devices, wherein the second portion of the plurality of devices carries the first service application, and wherein the second topology network displays second graphical representations of the first service application, the second portion of the plurality of devices, and second indications that the second portion of the plurality of devices carries the first service application.

11. The apparatus of claim 10, wherein the one or more processors are further configured to execute the instructions to cause the apparatus to:
obtain an application layer parameter, a logical layer parameter, an overlay layer parameter, and a physical layer parameter for the first service application; and
present an application layer view, a logical layer view, an overlay layer view, and a physical layer view that are respectively based on the application layer parameter, the logical layer parameter, the overlay layer parameter, and the physical layer parameter, wherein the application layer view reflects service information of at least one business service in the first service application, the logical layer view reflects network resource information of the first service application, the overlay layer view reflects a traffic flow status of the at least one business service, and the physical layer view reflects the second topology network.

12. The apparatus of claim 11, wherein the first topology network further reflects a network resource status of the first device.

13. The apparatus of claim 12, wherein the one or more processors are further configured to execute the instructions to cause the apparatus to:
obtain the network resource status of the first device after the first topology network or the second topology network is presented; and
display a traffic exception status of the first service application when the network resource status of the first device changes, wherein the traffic exception status comprises a traffic exception path.

14. The apparatus of claim 13, wherein the one or more processors are further configured to execute the instructions to cause the apparatus to:
highlight the traffic exception path in the overlay layer view;
obtain service update information; and
update, in the application layer view, a business service in the first service application based on the service update information.

15. The apparatus of claim 10, wherein the one or more processors are further configured to execute the instructions to cause the apparatus to:
monitor a network status of the plurality of devices;
when the network status of a device in the plurality of devices is abnormal exists, obtain a fault status of the device; and
identify an exception handling policy based on the fault status.

16. The apparatus of claim 10, wherein the one or more processors are further configured to execute the instructions to cause the apparatus to:
receive a first operation instruction on the first device to obtain the first identifier; or
receive a second operation instruction on the first service application to obtain the second identifier.

17. The apparatus of claim 12, wherein the one or more processors are further configured to execute the instructions to cause the apparatus to:
rotate the application layer view, the logical layer view, the overlay layer view, and the physical layer view based on a preset three-dimensional model after presenting the application layer view, the logical layer view, the overlay layer view, and the physical layer view based on the application layer parameter, the logical layer parameter, the overlay layer parameter, and the physical layer parameter; or
obtain a rotation angle based on angle information of the application layer view, the logical layer view, the overlay layer view, and the physical layer view, and rotate the application layer view, the logical layer view, the overlay layer view, and the physical layer view based on the rotation angle.

18. A computer program product comprising computer-executable instructions stored on a non-transitory computer-readable storage medium, the computer-executable instructions when executed by one or more processors, cause an apparatus to:
receive a first identifier or a second identifier, wherein the first identifier indicates a first device of a plurality of devices of a network management and control system, and wherein the second identifier indicates a first service application of a plurality of service applications;
display, in response to receiving the first identifier of the first device and based on the first identifier of the first device and association relationships between the plurality of devices and the plurality of service applications, a first topology network wherein the first topology network reflects a first topology relationship between the first device and a first portion of the plurality of service applications, wherein the first device carries the first portion of the plurality of service applications, and wherein the first topology network displays first graphical representations of the first device, the first portion of the plurality of service applications, and first indications that the first device carries the first portion of the plurality of service applications; and
display, in response to receiving the second identifier of the first service application and based on the second identifier of the first service application and the association relationships, a second topology network, wherein the second topology network reflects a topology relationship between the first service application and a second portion of the plurality of devices, wherein the second portion of the plurality of devices carries the first service application, and wherein the second topology network displays second graphical representations of the first service application, the second portion of the plurality of devices, and second indications that the second portion of the plurality of devices carries the first service application.

19. The computer program product of claim 18, wherein the computer-executable instructions when executed by the one or more processors to further cause the apparatus to:
obtain an application layer parameter, a logical layer parameter, an overlay layer parameter, and a physical layer parameter for the first service application; and
present an application layer view, a logical layer view, an overlay layer view, and a physical layer view that are respectively based on the application layer parameter, the logical layer parameter, the overlay layer parameter, and the physical layer parameter, wherein the application layer view reflects service information of at least one business service in the first service application, the logical layer view reflects network resource information of the first service application, the overlay layer view reflects a traffic flow status of the at least one business service, and the physical layer view reflects the second topology network.

20. The method of claim 1, wherein the first topology network further displays a multiple layer network configuration comprising multiple layers, wherein each of the multiple layers corresponds to one of the first portion of the plurality of service applications, and wherein the plurality of service applications comprises an office application, a payment application, and a security application.

* * * * *